United States Patent [19]

Masse et al.

[11] Patent Number: 4,673,560

[45] Date of Patent: Jun. 16, 1987

[54] GENERATION OF SULPHUR TRIOXIDE FROM OLEUM USING MICROWAVE ENERGY

[75] Inventors: Gary M. J. Masse, Burlington; Anthony C. F. Edmonds, North York, both of Canada

[73] Assignee: C-I-L Inc., North York, Canada

[21] Appl. No.: 771,054

[22] Filed: Aug. 30, 1985

Related U.S. Application Data

[63] Continuation-in-part of Ser. No. 703,402, Feb. 20, 1985, abandoned.

[51] Int. Cl.[4] .................... C01B 17/74; C01B 17/98; H05B 6/64

[52] U.S. Cl. .................................. 423/532; 423/522; 219/10.55 M; 219/10.55 R; 219/10.57; 204/157.43; 204/157.49

[58] Field of Search .............. 423/521, 522, 531, 532, 423/537; 219/10.55 M, 10.57, 10.55 R; 204/157 R, 157 H, 157.43, 157.49

[56] References Cited

U.S. PATENT DOCUMENTS

| | | | |
|---|---|---|---|
| 3,577,322 | 5/1971 | Webster et al. | 219/10.55 M |
| 3,771,234 | 11/1973 | Forster et al. | 219/10.55 M |
| 3,963,892 | 6/1976 | Camph et al. | 219/10.55 M |
| 4,055,001 | 10/1977 | Forster et al. | 219/10.55 M |
| 4,163,140 | 7/1979 | Bardett | 219/10.55 M |
| 4,310,739 | 1/1982 | Haten | 219/10.55 M |
| 4,312,640 | 1/1982 | Verrando | 55/62 |
| 4,313,786 | 2/1982 | Smith | 219/10.55 M |
| 4,364,859 | 12/1972 | Ohtrsuka et al. | 219/10.55 M |
| 4,376,107 | 3/1983 | Morgenthaler | 423/531 |
| 4,417,116 | 11/1983 | Black | 219/10.55 M |
| 4,434,345 | 2/1984 | Muscatell | 219/10.57 |

OTHER PUBLICATIONS

Cord et al, Microwave Spectral Tables, National Bureau of Standards, Monograph #70, vol. IV, Oct. 68, pp. 385-386.

Copson, David, A Microwave Heating in Freeze Drying Electronic Ovens & Other Application, AVI Publications Co., Westport, Conn., 1962, pp. 371-373.

Kirk-Othmer, Encyclopedia of Chemical Technology, 3rd edition, 1981, John Wiley & Sons, N.Y., N.Y., pp. 494-498, 516-517.

Kuczkowski et al, J. Amer. Chem. Soc., (1981), 103, 2561-2566.

*Primary Examiner*—Gary P. Straub
*Attorney, Agent, or Firm*—Cushman, Darby & Cushman

[57] ABSTRACT

Process and apparatus for the generation of sulphur trioxide from oleum using microwave energy for use in the sulphonation and nitration of organic compounds and the fortification of oleum. The process provides improved control of production and concentration of the sulphur trioxide produced and comprises subjecting sulphur trioxide-rich oleum feed to microwave energy for a sufficient period of time to produce sulphur trioxide vapour and spent oleum; isolating said sulphur trioxide vapour and collecting said spent oleum.

5 Claims, 2 Drawing Figures

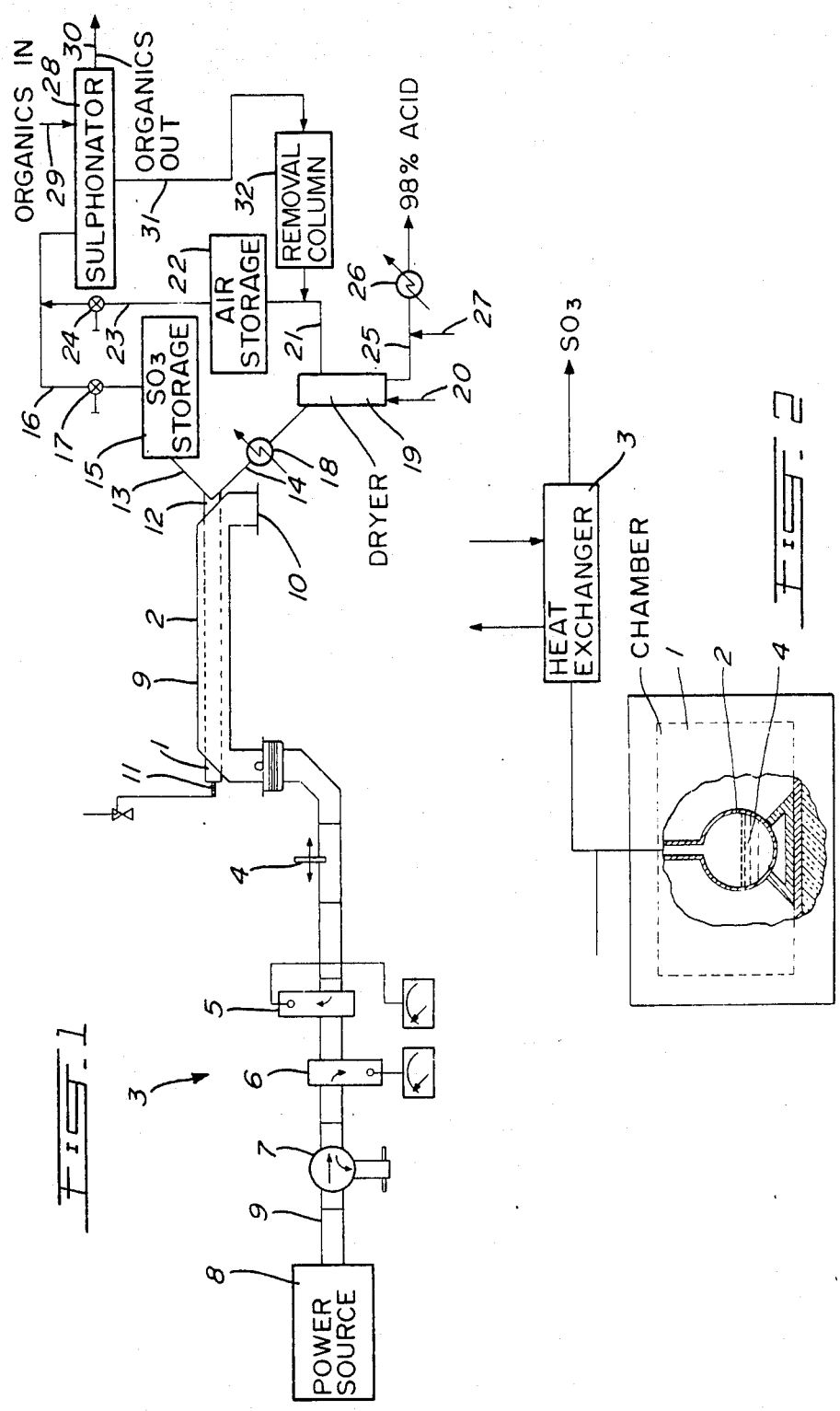

GENERATION OF SULPHUR TRIOXIDE FROM OLEUM USING MICROWAVE ENERGY

This is a contination-in-part of application Ser. No. 703,402 filed Feb. 20, 1985, now abandoned.

This invention relates to a process and apparatus for the generation of sulphur trioxide from oleum using microwave energy and, more particularly, to the use of such sulphur trioxide in the sulphonation and nitration of organic compounds and the fortification of oleum.

Sulphonation of organic compounds is generally carried out by using gaseous mixtures of dry air containing 3–6% sulphur trioxide sparged into a reactor containing an anhydrous liquid system containing the organic compound. The requisite amount of sulphur trioxide in the gaseous mixture is dependent on the nature of the organic moiety being sulphonated. For some rather insensitive applications, pure liquid sulphur trioxide may be used. A parameter of critical importance to the sulphonation industry is the ratio of organic moiety to sulphur trioxide. Consequently, if high quality sulphonate is required, careful control of the sulphur trioxide concentration in the gaseous mixture is required.

In one known system, the sulphur trioxide gas used in the sulphonation reaction is provided 'on-site' by the burning of dry sulphur in dry air to produce sulphur dioxide which is converted to sulphur trioxide in a mini sulphuric acid plant converter. The effluent gas from the sulphonation reactor is passed to an absorber to remove residual sulphur trioxide and then vented to atmosphere. This system, however, suffers from the serious drawbacks of being capital intensive in that many items of expensive and complicated equipment are involved, is difficult to start-up and shut-down, and is not very flexible in terms of gas flow and sulphur trioxide gas strength.

Alternative systems are known which utilize oleum as a source of sulphur trioxide gas.

In one such alternative, dry air is passed through the oleum to facilitate sulphur trioxide stripping of the oleum by mass transfer. Such a process allows of an easier and greater sulphur trioxide desorption than does the mere heating of the oleum. However, in all such systems, drying of all feed air and the fume scrubbing of effluent gas is carried out by traditional means with subsequent venting to atmosphere.

Fume scrubbing as generally practised involves the use of aqueous solutions of alkaline materials such as caustic soda, soda ash, lime and the like. While this approach may reduce fumes to environmentally acceptable levels it produces a wet acidic gas which is not readily usable for other purposes. In addition, aside from the lack of utility of the effluent gas, the alkaline scrubbing materials are relatively expensive, are difficult to control, and produce a liquid effluent which can itself constitute a disposal problem.

The drying of all feed air used to effect sulphur trioxide stripping of the oleum is essential in order to prevent production of sulphuric acid in the sulphur trioxide/air gaseous mixture. Silica gel or similar solid drying systems are generally used in sulphonation systems wherein the silica gel is in packed beds and with subsequent gas switching from bed to bed. Silica gel regeneration is effected by hot air stripping while the bed is off-line. Such drying systems have serious disadvantages in that the regeneration process involves high energy requirements, the drying columns have pressure drops while the continuous bed switching frequently results in air leakage and resultant inadequate drying.

In a variation on such an oleum feed system, oleum containing up to 37% free sulphur trioxide is heated in a boiler to provide pure sulphur trioxide which is then fed in air to a sulphonation reactor. The spent oleum from the thermal stripping generally contains 20–25% sulphur trioxide and is returned to the supplier for fortification. While this latter system avoids the 'on-site' handling of elemental sulphur and its combustion to sulphur dioxide and subsequent oxidation to sulphur trioxide, the air drying and effluent gas scrubbing operations are complicated and expensive. Further, as only a relatively small amount of the sulphur trioxide in the oleum feed is utilized for sulphonation the throughput of oleum is significant.

One dominant factor in determining the amount of sulphur trioxide which may be stripped by heating the oleum is the corrosion of the heat exchangers. As the sulphur trioxide concentration in the oleum decreases and approaches 100% sulphuric acid, the boiling point of the oleum increases rapidly increasing corrosion rates. Corrosion characteristics of materials must be matched with their performance as heat exchangers. In the current art, techniques required to lower corrosion rates result in a decrease in the heat exchanger efficiency which thus requires larger heat exchange surface area and greater cost.

A major disadvantage of an air stripping operation in an oleum feed system is the difficulty in maintaining a constant sulphur trioxide concentration in the gaseous mixture. This is complicated by the fact that the stripping rate is dependent upon, inter alia, oleum strength, air flow rate and temperature of the stripping vessel. However, as hereinbefore mentioned, the amount of sulphur trioxide in the gaseous mixture is critically important for the production of high quality sulphonate.

Nitration of organic materials to produce explosives and dyestuffs, and other intermediate chemicals is commonly practised. Frequently, such nitrations are carried out in a mixture of nitric and sulphuric acids and depending on the nature of the substance to be nitrated, it sometimes is necessary to use highly concentrated acids. For example, the production of trinitrotoluene from dinitrotoluene requires the use of near anhydrous conditions at elevated temperatures. In other cases, minimizing the amount of spent acid, requiring potentially hazardous expensive treatment before discharge or recycle, is of economic importance. This is specially true in the production of explosive nitrate esters such as nitroglycerine and nitroglycol. Still other nitrations such as that of N-methyl-imidazole, a pharmaceutical intermediate, cannot be carried out in water containing acid mixtures without yield losses due to ring opening and oxidation side reactions which can consume large amounts of valuable material informing by-products. These by-products may themselves consume the remaining nitric acid exothermically creating a dangerous "runaway".

In all these cases above the nitration reaction itself produces water. The acid becomes spent or inactive eventually due to the quantities of water accumulating in it from nitration and oxidation. It is, therefore, advantageous to add as little extraneous water as is feasible. Using sulphuric acid at maximum or azeotropic strength of 98% as part of the nitration feed represents one measure to minimize the extraneous water content. This quantity of water can be further reduced using oleum of up to 65% in strength. The ultimate link of the progression is represented by using sulphur trioxide as feed stock. While liquid sulphur trioxide has been used in nitration reactions, it poses very severe technical difficulties due to well-known potentially violent phase changes which can occur with liquid sulphur trioxide on storage.

In many nitrations, essentially anhydrous nitric acid is required. However, this material is not an article of commerce. It is hazardous to handle because it is a powerful oleophilic oxidizing agent and it is difficult and expensive to make. Regular plants producing this material on-site use sulphuric acid as an agent to break the nitric acid water azeotrope (68%). The weakened sulphuric acid is then sent for refortification or is fed to a sulphuric acid concentrator. Recycling contaminated sulphuric acid through a distant sulphur trioxide plant or, alternately, expanding capital and running costs on a concentrator can be avoided.

Oleum has important uses in industry in (a) the sulphonation of organic compounds by either (i) direct contact of the oleum with the organic compound, or, (ii) as a source of sulphur trioxide vapour of use in the sulphonation reaction; and (b) the oxidation of organic compounds, e.g. the manufacture of resorcinol.

The most commonly found oleums in industry are 10% oleum (10% sulphur trioxide in 100% sulphuric acid), 25%, 37–40% and 65%. Oleums of strengths up to 25% sulphur trioxide are generally made by passing into concentrated sulphuric acid gaseous mixtures comprising 7–14% v/v sulphur trioxide generated from sulphur burning plants or metal ore smelter plants. It is generally more difficult to manufacture 37% oleum direct from such sulphur trioxide sources unless a concentration of $\geq 14\%$ sulphur trioxide is available. However, this is the process by which 37% oleum is manufactured.

65% Oleum cannot be made from such relatively dilute sulphur trioxide gaseous mixtures without subsequent enhancement of the sulphur trioxide concentration. Such enhancement requires additional apparatus, capital and operating and maintenance costs. 65% Oleum is thus generally produced by passing into 37% oleum sulphur trioxide vapour generated by the thermal stripping of 37% oleum or vaporization of liquid sulphur trioxide. Liquid sulphur trioxide is a very dangerous chemical to handle, transport and store, and accordingly, 'on-site' generation of sulphur trioxide vapour from a source other than liquid sulphur trioxide is much preferred.

As mentioned, hereinbefore, corrosion of the heat exchangers causes a major drawback in the thermal stripping of oleums to generate sulphur trioxide vapour. Thus, processes which enable greater amounts of sulphur trioxide vapour to be readily generated from oleums and which result in spent oleums having <20% sulphur trioxide concentration, particularly 5–10% sulphur trioxide, with reduced corrosion problems, offer economic advantages.

The present invention has as a principle object the provision of a simple system for the sulphonation or nitration of organic compounds or fortification of oleum which is dependent upon oleum as a source of sulphur trioxide gas and which offers a high removal of sulphur trioxide from the oleum feed with a resultant saving in energy and corrosion costs.

One source of energy available for the heating of materials is that produced by microwave irradiation. Microwave energy in the 800–3000 MHz range has been widely used for cooking and reheating of foods in microwave ovens. Frequencies of approximately 915 and approximately 2450 MHz are the ones primarily used in North America for this purpose, although other frequencies, notably 5850 MHz and 18000 MHz, are also available. In Western Europe, 896 MHz is generally used, and in Japan 100–450 KHz or 40–50 MHz is generally used.

An example of the industrial use of microwave radiation has been described in U.K. Pat. No. 1,567,129, in the name of Foster Wheeler Energy Corporation. In U.S. Pat. No. 1,567,129, microwave radiation is used to desorb any adsorbed sulphur dioxide from coal, coke or char by subjecting the coal and the like to radiation at a frequency sufficient to cause arcing, thereby oxidizing a portion of the carbon and thus increasing the temperature of the coal.

However, despite the successful application of microwave radiation to foodstuffs, the stigma of microwave equipment poorly designed to meet the needs of the chemical process industry has severely hampered its utility in this field. In addition, microwave technology generally suffers from the reputation of being prohibitively expensive.

We have now discovered that a steady stream of sulphur trioxide vapour can be readily obtained from sulphur trioxide-rich oleum by means of microwave irradiation under controlled conditions. The resultant spent oleum is readily available for conversion to sulphuric acid of strength circa 98%, through reaction with moist air, if so desired.

The production of sulphur trioxide vapour directly from oleum in the absence of purging gas, such as air, affords greater control of the concentration of the sulphur trioxide in the air with which it may, optionally, be subsequently combined. In the alternative, the sulphur trioxide vapour may be passed undiluted to a chemical reactor or oleum absorber. Thus, greater control of the sulphur trioxide/organic compound ratio can be attained. When a sulphur trioxide-air mixture is desired, the desired concentration can be readily achieved and controlled merely by the use of flowmeters.

It has been advantageously seen that a minimal amount of sulphuric acid is present in the sulphur trioxide vapour stream—the actual amount being dependent upon, inter alia, oleum strength, temperature and residence time. For example, at 235.6° C., the equilibrium partial pressures of $SO_3:H_2SO_4: H_2O$ above a 5% oleum solution are 710:49.8:0.2 mmHg. Therefore, for most applications, no expensive high efficiency acid mist eliminators would be required.

Accordingly, the invention provides in its broadest aspect a process for the generation of sulphur trioxide comprising subjecting sulphur trioxide-rich oleum feed to microwave energy for a sufficient period of time to produce sulphur trioxide vapour and spent oleum; isolating said sulphur trioxide vapour and collecting said spent oleum.

The generation of sulphur trioxide from the oleum feed can be effected by microwave irradiation either in a batch process or, preferably, in a continuous process. A batch system generally involves the use of a reaction pot or vessel inside a microwave oven and containing the oleum feed during the irradiation step and, optionally, means, such as a vacuum system, for removing the sulphur trioxide produced as vapour. After the oleum feed has been depleted of sulphur trioxide to the desired degree the spent oleum is removed from the pot. The time required to achieve the required depletion depends upon parameters such as the concentration of the oleum feed, resultant oleum strength and wavelength of the microwave radiation used. Such parameters can be easily determined by those skilled in the art.

In a preferred process, the oleum feed is continuously introduced to a microwave field applicator wherein it is subjected to microwave radiation as it passes through the applicator. The spent oleum emerges from the applicator as a liquid whereas the sulphur trioxide emerges as a vapour.

Thus, in a preferred form, the invention provides a process as hereinbefore defined further comprising continuously introducing said sulphur trioxide-rich oleum feed through a microwave field applicator wherein said oleum feed is subjected to said microwave energy, collecting said sulphur trioxide vapour and said spent oleum.

A further advantage of the present invention stems from the use of microwave power. As described, hereinbefore, the current art is caught in a trade-off between corrosion resistant materials of construction and heat transfer coefficients—the latter of which determines equipment size. The use of construction materials which transmit microwaves without interaction, such as quartz and which have limited use with the current art are most desirable in the present invention. Such materials are generally extremely resistant to the highly corrosive oleum, yet are invisible and do not interact with the microwave field. This permits efficiencies of microwave field utilization of greater than 90%.

A further advantage of using microwave radiation according to the process of the invention is that oleum absorbs the electromagnetic energy uniformly, inside the container means holding the oleum or through which it passes, e.g., a quartz pot or a quartz tube inside the microwave field applicator, and not just at the surface of the container. The heat buildup takes place extremely rapidly and is controlled, almost instantaneously, by the power applied. Since the energy transfer occurs by radiation rather than surface-to-surface contact, the attainable temperature is limited primarily by the rate of sulphur trioxide emission from the oleum being processed.

Not all materials absorb microwave radiation. Some materials, such as metals, reflect microwaves, while others, such as paper, glass and many plastics, transmit the waves without interaction. Thus, in the process and apparatus according to the invention, any material which transmits microwave radiation without interaction and is not attacked by oleum represents a desirable material of construction—glass or quartz are preferred examples. The desirability of glass or glass-lined container means of use in instant invention may be contrasted to prior art sulphur trioxide from oleum systems wherein glass is not employed because of the thermal shock that can be produced due to the surface-to-surface heating and because of its poor heat transfer coefficient. However, in instant process, these disadvantages are not present. Indeed, since glass is more corrosion resistant than iron—especially at elevated temperatures, glass offers an additional advantage.

Another advantage of using microwave radiation according to the process of the invention is that relating to energy costs. In the majority of the prior art techniques, steam is consumed in order to raise the oleum to the requisite temperature to facilitate sulphur trioxide vapour generation with or without sparging air—which air per se requires pre-heating. In the process according to the invention efficiencies of microwave field utilization of greater than 90% when coupled with 75% efficiency of electric line power to microwave energy provide advantageous energy savings.

The above processes can be carried out utilizing equipment similar to that used in commercial microwave heating in the food industry. Such equipment is well known in the art. It would, of course, have to be modified because of the peculiarities of oleum processing and the volumes of vapours evolved.

Accordingly, in a further feature the invention provides apparatus for the generation of sulphur trioxide from oleum feed comprising container means for containing said oleum feed, microwave means for subjecting said oleum feed in said container means to microwave energy for a sufficient period of time to effect production of sulphur trioxide vapour whereby said oleum feed is depleted of sulphur trioxide to a desired degree, means for removing said sulphur trioxide vapour and means for collecting spent oleum.

The container means can be a reaction pot or vessel or, preferably a tubular reactor disposed within a microwave field applicator.

Thus, in a preferred feature the invention provides apparatus as hereinabove defined wherein said container means comprises a tubular reactor disposed within a microwave field applicator.

The oleum feed can be depleted of sulphur trioxide to any desired level. Generally, levels of 5% free sulphur trioxide in the spent oleum are attained which provides for reduced amounts of sulphur trioxide-rich oleum to be shipped, used and re-fortified, which results in significant transportation cost savings over the processes conventional in the art.

The production from the spent oleum of, say, 98% sulphuric acid is most desirable from a marketing standpoint and thus an advantage stemming from the present invention. Although outlets for 20% oleum, the waste stream produced in the current art, are small, 98% sulphuric acid is an acid of commercial importance used in such processes as petroleum alkylation, sulphonation and hydrofluoric acid manufacture.

The 98% sulphuric acid can be readily obtained from the spent oleum by passing air through it and simultaneously providing a supply of dry air which may be subsequently mixed with the sulphur trioxide vapour under controlled conditions for use in the sulphonation reaction.

In an alternative embodiment where the sulphur trioxide concentration in the sulphur trioxide/air mixture for sulphonation need not be so carefully controlled, dry air may be sparged through the oleum feed simultaneous with microwave irradiation of the feed. Such air purging is more adaptable to the use of reduced strength oleum feed as there is significant room to raise oleum temperatures to compensate.

Accordingly, in a further feature the invention provides a process as hereinbefore defined further comprising passing dry air through said sulphur trioxide-rich oleum feed while said oleum feed is subjected to said microwave energy to produce a sulphur trioxide-air mixture, and collecting said sulphur trioxide-air mixture and said spent oleum.

Preferably, the microwave energy is applied at a frequency of 915, 2450, 5850, or 18000 MHz.

It is a further object of the present invention to provide processes wherein sulphur trioxide vapour produced by the invention as hereinbefore defined is utilized in the sulphonation or nitration of organic compounds or fortification of oleum.

Accordingly, the invention in a further feature provides a process for the sulphonation of an organic compound comprising a process for the generation of sulphur trioxide vapour as hereinbefore defined and further comprising introducing said sulphur trioxide vapour into a sulphonation reactor containing said organic compound to effect sulphonation; and isolating sulphonated organic product.

In a further feature the invention provides a process for the nitration of an organic compound comprising a process for the generation of sulphur trioxide vapour as hereinbefore defined and further comprising introducing said sulphur trioxide vapour into a nitration reactor containing said organic compound to effect nitration; and isolating nitrated organic product.

The reaction conditions to effect sulphonation or nitration of the organic compound and isolation steps required to obtain the sulphonated or nitrated product fall within the skill of the art and would depend on the organic compound to be sulphonated or nitrated and resultant product.

The invention has use in the manufacture of sulphonated benzenes and naphthalenes and, particularly, sulphonated long chain aliphatic hydrocarbons of use in the detergent industry.

It is highly desirable that little or no inert gases be present in the sulphur trioxide vapour in the nitration process because any such inert gases would strip nitric acid and other volatile materials from the nitration reactor.

This rules out use of sulphur trioxide streams from regular sulphur trioxide production plants. It can be readily seen that the process according to the invention in its broadest aspect can be used as a source of pure sulphur trioxide vapour for feeding to cooled azeotropic regular nitric acid to produce the anhydrous mixed acid required.

The invention in its broadest aspect is also applicable in the preparation of premixed acid nitrating mixtures of use in the nitration of the organic compound. Such premixed acid nitrating mixtures can be prepared in the absence of the organic compound from less concentrated commercially available nitric and sulphuric acid supplies or from recycled and partially reconcentrated acids by treatment with sulphur trioxide vapour generated according to the invention in its broadest aspect. Premixing offers the advantage of removing part of the heat load prior to mixing with the organic compound in order to reduce thermal degradation of the nitric acid.

Accordingly, the invention provides in yet a further feature a process for the production of a nitrating medium suitable for the nitration of an organic compound comprising introducing sulphur trioxide vapour generated from oleum by microwave energy as hereinbefore defined into a nitric acid-sulphuric acid mixture to produce said nitrating medium.

Useful nitrating media generally comprise a range of nitric and sulphuric acid mixtures with varying concentrations of water or acid anhydride present. For any given organic substance to be nitrated there exists a maximum water content above which nitration proceeds impractically slowly. Thus, for example, in the nitration of dinitrotoluene to trinitrotoluene essentially anhydrous conditions are necessary. However, in the nitration of toluene to mononitrotoluenes or of benzene to nitrobenzene nitration can be effected in acid media containing 25% water.

The reasons for these vast variations are well known and it falls within the skill of the art for a particular nitrating medium to be selected for the nitration of any particular organic compound.

In yet a further feature the invention provides a process for the fortification of an oleum comprising a process for the generation of sulphur trioxide vapour as hereinbefore defined and further comprising introducing said sulphur trioxide vapour into a fortification vessel containing said oleum to effect fortification, and isolating said fortified oleum of desired concentration.

The fortification process according to the invention is most valuable in the manufacture of 65% oleum. It is obvious that any less concentrated oleum may be fortified to the 65% level. The process has particular value where 20-25% oleum is made from relatively dilute smelter gas and which oleum is fortified by sulphur trioxide vapour generated by microwave irradiation to the 37%-40% or 65% level. The level to which the sulphur trioxide oleum feed is depleted on the generation of sulphur trioxide vapour may be controlled by the skilled man based on the savings to be gained by the generation of the maximum amount of sulphur trioxide per unit volume of oleum on the one hand, and the oleum temperatures to be attained in such generation on the other hand. It will be readily appreciated that the 20% oleum limitation currently obtained in the art processes may be easily reduced to, say, 5% oleum without undue risk of corrosion. Thus, while not so limited, the invention usefully provides for the fortification of an oleum having a sulphur trioxide initial concentration in the range 20-40% to a final sulphur trioxide concentration in the range 37-65%, using oleum having a sulphur trioxide concentration in the range 20-40%.

In order that the invention may be better understood, several embodiments will now be described by way of example only and with reference to the drawings wherein:

FIG. 1 is a schematic diagram of a preferred apparatus and process according to the invention and used to provide sulphur dioxide for use in the sulphonation of an organic compound; and FIG. 2 is a schematic diagram of an alternate embodiment of the apparatus and process according to the invention.

FIG. 1 shows a tubular quartz reactor (2.5 cm O.D.) 1 fitted inside a microwave applicator 2 linked to a commercial microwave generator 3.

The generator 3 further comprises a slide screw tuner 4 to minimize reflected power, directional couplers 5 and 6 to couple forward and reflected power and circulator 7 to prevent reflected power from reaching microwave power source 8. Each of above form part of a waveguide 9. The waveguide in the applicator terminates with a shorting plate 10.

The microwave applicator is designed to efficiently deliver the microwave field to the reactor 1. The dimensions of the waveguide are designed to support a standing wave and can be easily determined by those skilled in the art. In the embodiment shown the WR340 waveguide dimensions of 15 cm long by 8.5 cm high by 4.2 cm deep support a standing wave of 2450 MHz and provides an interaction zone of approximately 30 cm.

Reactor 1 has an oleum feed inlet 11 and spent oleum outlet 12. Outlet 12 is attached to an upper line 13 and lower line 14. Line 13 leads to a sulphur trioxide vapour holding tank 15 having an exit line 16 fitted with sulphur trioxide flowmeter 17. Spent oleum line 14 is provided with a cooler 18 and leads to an air dryer 19 having air inlet line 20 and air outlet line 21. Outlet line 21 leads to a dry air storage tank 22 having an exit line 23 leading to line 16 and provided with an air flowmeter 24. Air dryer 19 has a spent oleum exit line 25 provided with cooler 26 and water inlet 27.

Line 16 leads to sulphonator 28 provided with organic compound inlet 29, outlet 30 and dry air outlet 31 leading to an organic compound removal column 32 and air outlet line 21.

In operation, a sulphur trioxide-rich oleum feed (37.5% $SO_3$) is fed through quartz reactor 1 at a depth of 1 cm and the microwave interaction provided by the 1 kilowatt 2450 MHz magnetron is optimized for maximum efficiency. The interaction of the microwave field and the oleum feed results when both energy transfer to the oleum and oleum temperature is sufficiently high in a stream of sulphur trioxide vapour which exits along line 13 and a spent oleum stream which exits along line 14. The amount of sulphuric acid present in the sulphur trioxide stream is minimal and is dependent upon the concentration of the feed oleum and spent oleum.

The sulphur trioxide is stored in holding tank and controllably released through line 16 and monitored by flowmeter 17. The spent oleum is cooled by cooler 18 and passed through dryer 19 and mixed with the measured amount of water to produce sulphuric acid (98%) product. Air entering dryer 19 from line 20 is dried and passed to storage tank 22 along line 21 for subsequent controlled admixture with sulphur trioxide vapour in line 16. The resultant sulphur trioxide-air mixture is sparged into sulphonator 28. The spent gaseous mixture may be recycled to line 21 after removal of any residual organic material contaminant in column 32. The nature of the removal column is dependent on the nature of the organic material to be removed. In the case of aromatic organic materials the column may consist of an activated carbon bed. Activated silica and alumina are examples of additional organic removal materials.

In a modification of above process air from line 21 may be sparged through the oleum feed in tube 1 while feed is being irradiated. Resultant gaseous mixture exiting through line 13 would then be passed direct to sulphonator 28.

The above embodiment describes a continuous process for the generation of sulphur trioxide. The exact conditions necessary to carry out the above continuous process will be dependent on factors such as the concentration of the feed oleum, spent oleum, oleum flow rate and wavelength of microwave radiation used, and can be easily determined by those skilled in the art.

FIG. 2 shows an alternative embodiment of a process and apparatus according to the invention involving a non-continuous or batch process. It shows a Litton commercial microwave oven chamber 1 modified to accept a glass distillation pot 2 connected to a heat exchanger 3. In this process, the glass vessel 2 contains sulphur trioxide-rich oleum 4 irradiated with microwave energy (2450 MHz) sufficient to produce a stream of sulphur trioxide vapour which may be cooled by means of heat exchanger 3, passed to storage and subsequently used. The resultant spent oleum is subsequently removed from pot 2.

It can be readily seen by the skilled man that the apparatus and processes particularly described hereinbefore can be readily modified to be suitable for the nitration of an organic compound or the fortification of an oleum. In each case sulphonator 28 can be substituted by a nitration reactor or a fortification vessel containing oleum, as the case may be.

We claim:

1. A process for the generation of sulphur trioxide comprising subjecting sulphur trioxide-rich oleum feed to microwave energy for a sufficient period of time to produce sulphur trioxide vapour and spent oleum; isolating said sulphur trioxide vapour and collecting said spent oleum.

2. A process as claimed in claim 1 comprising continuously introducing said sulphur trioxide-rich oleum feed through a microwave field applicator wherein said oleum feed is subjected to said microwave energy; collecting said sulphur trioxide vapour and said spent oleum.

3. A process as claimed in claim 1 further comprising mixing said sulphur trioxide vapour with air.

4. A process as claimed in any one of claims 1 or 2 further comprising passing dry air through said sulphur trioxide-rich oleum feed while said oleum feed is subjected to said microwave energy to produce a sulphur trioxide-air mixture, and collecting said sulphur trioxide-air mixture and said spent oleum.

5. A process as claimed in claim 1 or claim 2 further comprising introducing said sulphur trioxide vapoour into a fortification vessel, containing an oleum to be fortified, to effect fortification, and isolating fortified oleum of desired concentration.

* * * * *